United States Patent [19]

Caldwell

[11] Patent Number: 4,539,862

[45] Date of Patent: Sep. 10, 1985

[54] DETENT HOLD AND RELEASE MECHANISM

[75] Inventor: Patrick N. Caldwell, Tucson, Ariz.

[73] Assignee: The Cessna Aircraft Company, Wichita, Kans.

[21] Appl. No.: 327,382

[22] Filed: Dec. 4, 1981

[51] Int. Cl.[3] ........................ G05G 5/18; F16K 31/46; F16D 27/01

[52] U.S. Cl. ........................................ 74/527; 74/154; 192/84 PM; 335/140

[58] Field of Search ...................... 74/527, 529, 10.41, 74/152, 154, 142; 335/74, 75, 140, 229, 230; 192/84 PM, 104 C

[56] References Cited

U.S. PATENT DOCUMENTS

| | | | |
|---|---|---|---|
| 2,275,839 | 3/1942 | Boehne | 192/84 PM |
| 2,653,488 | 9/1953 | Wallace et al. | 74/527 |
| 2,702,609 | 2/1955 | Frazier et al. | 74/527 |
| 2,751,054 | 6/1956 | Delre | 74/529 |
| 2,836,774 | 5/1958 | Ashworth | 335/229 |
| 2,962,144 | 11/1960 | Heinemann et al. | 192/84 PM |
| 3,153,949 | 10/1964 | Rice | 74/527 |
| 3,236,043 | 2/1966 | Walton | 192/84 PM |
| 3,602,245 | 8/1971 | Meisel | 74/527 |
| 3,754,481 | 8/1973 | Collins | 74/527 |
| 3,790,129 | 2/1974 | Davis | 251/297 |
| 3,791,231 | 2/1974 | Geary | 192/84 PM |
| 4,164,721 | 8/1979 | Ishida et al. | 335/229 |
| 4,166,939 | 9/1979 | Switzer | 192/84 PM |
| 4,201,116 | 5/1980 | Martin | 91/387 |
| 4,319,211 | 3/1982 | Ueda et al. | 335/230 |
| 4,321,570 | 3/1982 | Tsunefuji | 335/229 |

FOREIGN PATENT DOCUMENTS

| | | | |
|---|---|---|---|
| 2065272 | 6/1981 | United Kingdom | 74/527 |

*Primary Examiner*—Gary L. Smith
*Assistant Examiner*—Vinh Luong
*Attorney, Agent, or Firm*—Edward L. Brown, Jr.

[57] ABSTRACT

A detent hold and release mechanism on a manually positioned valve controller which electrically signals a servo controlled conventional hydraulic control valve. The mechanism has a detented operating position and a spring-returned neutral position when the detent is released; the detent is held in operating position by a locking pawl urged by a permanent magnet. The mechanism is released by energizing an electro-magnet positioned adjacent the permanent magnet with reverse polarity whereby the combined magnet forces are neutralized, thereby releasing the pawl and allowing the valve controller to return to the neutral position.

5 Claims, 3 Drawing Figures

DETENT HOLD AND RELEASE MECHANISM

BACKGROUND OF THE INVENTION

The detent hold and release mechanism of the present invention is utilized on a manually positioned controller which provides varying electrical signals to an electro-hydraulic proportional control valve system of the type illustrated in assignee's U.S. Pat. No. 4,201,116. In systems of this nature, a conventional hydraulic control valve is hydraulically positioned by a small double-acting servo cylinder which in turn is controlled by a pilot valve actuated electrically through a double-acting solenoid. The solenoid transmits varying forces to the four-way pilot valve which in turn controls the position of the double-acting cylinder. The amount of DC voltage supplied to the solenoid is controlled by the manually positioned controller of the present invention. The controller includes a manually positioned potentiometer or rheostat which in turn is mechanically connected to the detent hold and release mechanism of the present invention.

The rotary movement of the controller handle, which is positioned by the operator, includes a detented position which causes an electrical signal of a certain voltage at the solenoid to apply a certain force against the servo valve which in turn permits fluid pressure to reposition the double-acting cylinder and in turn position the main control valve to a set operating position (all of which is described in detail in U.S. Pat. No. 4,201,116). The operating position might be a normal power-up or down position, float position or a regeneration position depending on the requirements of the particular system.

In the prior art, the detent mechanism is normally a spring-biased mechanical holding structure released by fluid pressure, as shown in U.S. Pat. No. 3,153,949, or by a solenoid, as shown in U.S. Pat. No. 3,790,129.

SUMMARY OF THE INVENTION

The detent hold and release mechanism of the present invention is mechanically tied to the handle of the valve controller and the potentiometer which supplies a variable amount of voltage to the above-mentioned solenoids which in turn control the main control valve. The detent hold and release mechanism includes an arcuate surface with one or more detents thereon held in a restrained position by a detent locking pawl which is spring biased against the arcuate surface and detent holding the controller handle in a detented position. Also urging the locking pawl against the detent, is a permanent magnet which attracts a magnetic contact plate joined to the locking pawl through a flexible spring arm. Positioned adjacent the permanent magnet is an electro-magnet with reverse polarity to that of the permanent magnet so that when energized, the magnetic forces of the permanent magnet are neutralized, thereby releasing the contact plate and locking pawl so that the controller handle can return to its neutral position.

Therefore, it is the principal object of the present invention to provide a new and improved electro-hydraulic valve controller with a detented position which is released by an electrical signal.

Another object of the present invention is to provide a new and improved detent hold and release mechanism utilizing permanent and electro-magnets.

Another object of the present invention is to provide a simplified detent hold and release mechanism having reduced release forces and wear problems.

These and other important objects and advantages of the present invention are specifically set forth in or will become apparent from the following detailed description of preferred embodiments of the invention, when read in conjunction with the accompanying drawings, wherein.

Figure 1:
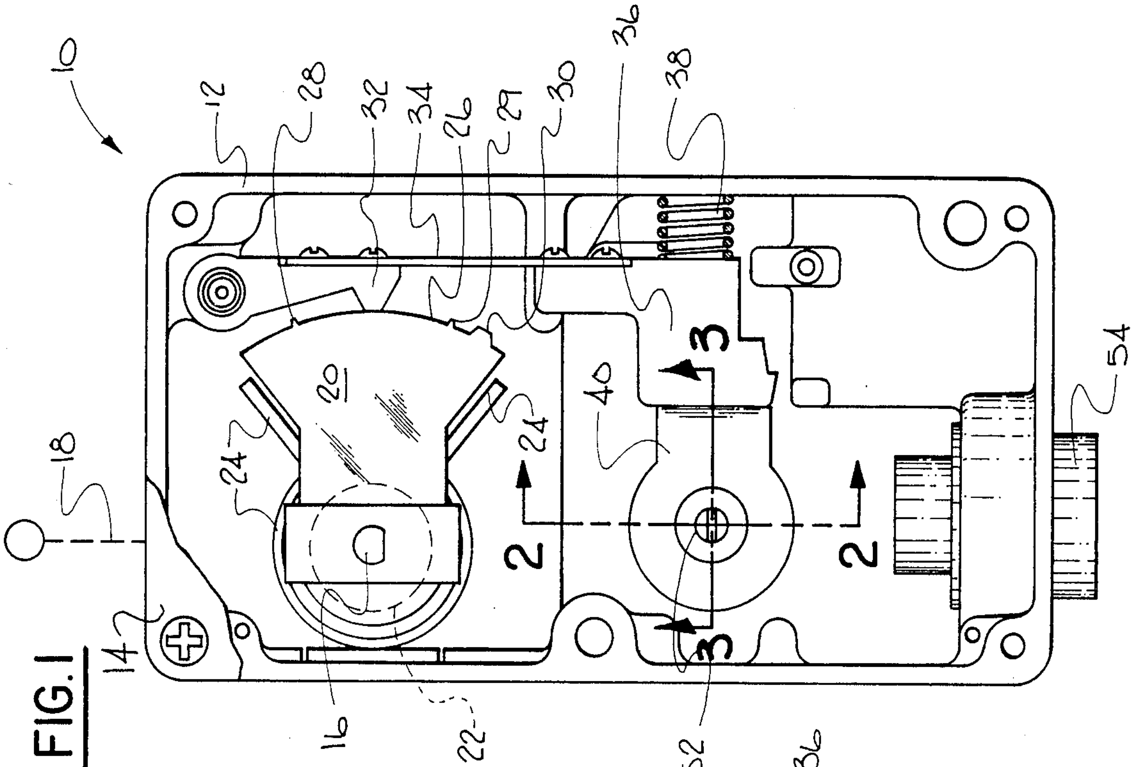
FIG. 1 is a sectional view through the valve controller of the present invention illustrating the various mechanical parts of the detent hold and release mechanism.
Figure 2:
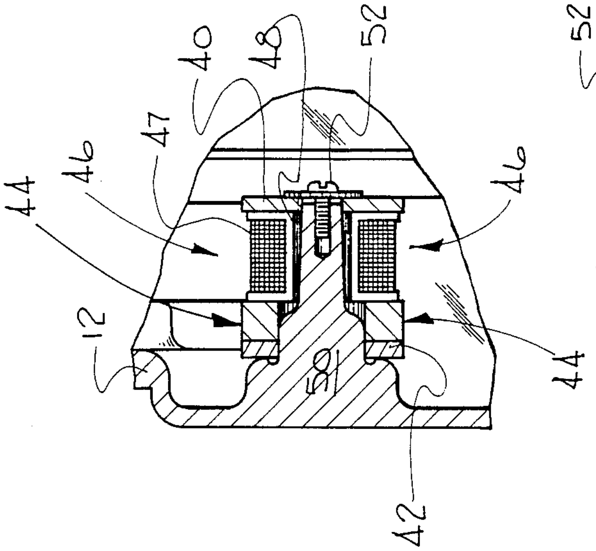
FIG. 2 is a partial sectional view taken along lines 2—2 of FIG. 1.
Figure 3:
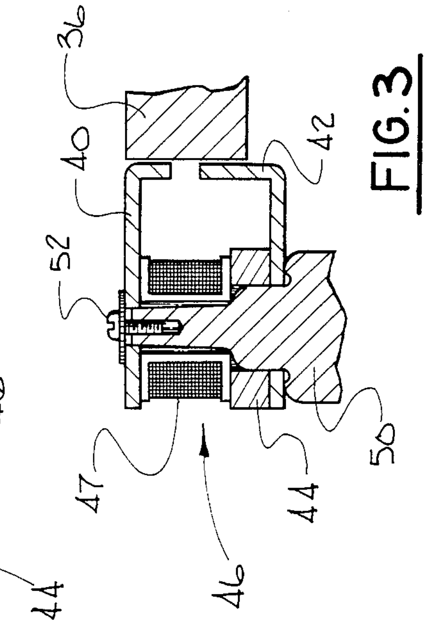
FIG. 3 is a partial section taken along lines 3—3 of FIG. 1.

Turning now more particularly to FIG. 1, the electro-hydraulic controller of the present invention is generally described by reference numeral 10. Controller 10 is surrounded by housing 12 with an access plate 14 on one side thereof broken away so that the various components of the controller can be seen. Pivotally journaled to the housing 12 is a connecting shaft 16 which extends out the back of the housing and attaches to an operating handle 18 (symbolically shown). Located inside of the housing 12 and mounted on connecting shaft 16 is a detent cam member 20. Also attached to the inside end of connecting shaft 16 is a potentiometer 22, shown only in dotted line. Since handle 18, cam 20 and potentiometer 22 are all mounted on a common shaft, any rotation of handle 18 causes a similar angular movement to detent cam 20 and potentiometer 22. Torsion spring 24 is anchored to housing 12 so that any rotation of cam 20, in either direction from its illustrated position, will bias the cam 20 back toward its illustrated neutral position. The right side of cam 20 has an arcuate surface 26 with three outwardly extending detents 28, 29 and 30. Pivotally mounted to housing 12 is a detent locking pawl 32, in facing engagement with arcuate surface 26 and detents 28, 29 and 30. Attached to pawl 32 and extending outwardly therefrom is a spring arm 34 carrying a magnet contact plate 36 at its outer end. Plate 36 is lightly urged in a leftwardly direction, as illustrated in FIG. 1, by spring 38 into contact with magnet pole pieces 40 and 42, as best seen in FIG. 3. Sandwiched between pole pieces 40 and 42 is a permanent magnet 44 and an electro-magnet 46. Electro-magnet 46 comprises a coil 47 wrapped around a steel spool 48. The spool 48 and the permanent magnet 44 provide a flow path for the magnetic field between pole pieces 42 and 40. Coil 47 of the electro-magnet is so positioned that when energized, its reverse polarity to that of permanent magnet 44 has a neutralizing effect on the magnet field of the permanent magnet. By energizing electro-magnet 46, the magnetic force of permanent magnet 44 is effectively cancelled. Pole pieces 40 and 42 and magnets 44 and 46 are held in their assembled position on housing 12 by a non-ferrous boss 50, extending outwardly from housing 12 and a mounting screw and washer 52.

Passing through the bottom of housing 12, as seen in FIG. 1, is an electrical receptacle 54 which transmits the various electrical conductors between the potentiometer 22 and the solenoids of the main control valve described in U.S. Pat. No. 4,201,116 mentioned above.

OPERATION

The electro-hydraulic proportional control valve shown and described in detail in U.S. patent 4,201,116 is controlled electrically by varying the voltage output from potentiometer 22.

With the controller valve handle 18 in the neutral position, as illustrated in FIG. 1, the potentiometer 22 transmits a zero or neutral standard voltage to the solenoids being controlled (as shown in the above-mentioned patent). When handle 18 is moved in a clockwise direction, pawl 32 will engage and ride over detent 28 to its first detented position. In this position, pawl 32 restrains the cam 20 and handle 18 even though torsional spring 24 is attempting to return handle 18 in a counterclockwise direction to its neutral position. Locking pawl 32 is held against detent 28 by the magnetic force of permanent magnet 44 attracting a steel contact plate 36 through pole pieces 40 and 42. When it is desirous to release detent 28 and allow the cam 20 to return to its neutral position; electro-magnet 46 is energized. Since the polarity of electro-magnet 46 is reversed from that of permanent magnet 44, the magnetic field produced by the electro-magnet 46 will neutralize the magnetic force of permanent magnet 44 thereby releasing detent 28. While there is still a light force on pawl 32 from spring 38, it will be overriden by the stronger spring force from torsional spring 24. With the magnetic forces on locking pawl 32 neutralized, the torsional spring 24 easily overrides spring 38 allowing detent 28 to pass over locking pawl 32 and return to the neutral position.

As previously mentioned, the controller 10 of the present invention is utilized with the electro-hydraulic proportional control valve, shown in U.S. Pat. No. 4,201,116. The controller 10 ultimately controls a motor such as motor 18 shown in the above-mentioned patent. While there are various conditions which might cause the controller 10 to release from the detented position, a typical system would be when a hydraulic cylinder such as cylinder 18 in the above-mentioned patent reaches the end of its stroke. A micro switch located at the end of a cylinder stroke could open a circuit energizing electro-magnet 46, thereby causing the detent to be released and the controller handle 18 and cam 20 to return to the neutral position. This would in turn electrically signal the solenoid coils in the above-mentioned patent to return the main control valve spool to a neutral position since the hydraulic cylinder had reached the end of its stroke. Another means for actuating the detent release would be the use of a pressure actuated electrical switch which would energize electro-magnet 46 when the piston reached the end of the stroke thereby causing a pressure build-up.

When controller handle 18 is moved in a counterclockwise direction from the illustration position, a first detent 29 is engaged by locking pawl 32 which might be a power-down position. A controller 10 has a second detented position when handle 18 is moved further in a clockwise direction, causing a second larger detent 30 to be overriden by pawl 32. This second detented position of the main control valve could be a float or a regeneration position of the valve and would be distinguishable over the first detented position due to the greater size of detent 30 and the corresponding additional force necessary on handle 18 to override said detent. When the controller handle 18 is forced to ride over the smaller detents 28 and 29, the contacting plate 36 does not break contact with the magnet pole pieces 40 and 42 due to the flexure of spring arm 34. However, when the controller handle 18 forces the locking pawl 32 over the large detent 30, the contact plate 36 will separate from the magnet pole pieces 40 and 42. By replacing spring arm 34 with a more flexible arm, the manual override force on handle 18 is decreased.

The valve controller 10 of the present invention can be used in various types of pressure or pressure-flow compensated systems as well as load responsive systems, all of which have variable displacement supply pumps. The controller can also be utilized in various types of fixed displacement systems.

Having described the invention with sufficient clarity to enable those familiar with the art to construct and use it, I claim:

1. A detent hold and release mechanism for use on a manually positioned valve controller, having a detented position and a spring for returning the controller from the detented position to a neutral position comprising:

a manually positioned rotating controller handle;

an arcuate contact surface connected to the controller handle;

detent means on the arcuate surface;

a detent locking pawl pivotally mounted on the controller with the pawl engaging surface located approximate the outer end of the pawl and the pawl being urged against the arcuate surface for engaging the detent means and holding the controller handle in a detented position;

a spring arm connected to the outer end of the pawl forming an extension thereof and a contact plate attached to the free end of the spring arm;

a permanent magnet means having a pair of pole pieces engaging the contact plate for holding the locking pawl against the detent means in the detented position; and an electro-magnet means positioned adjacent the permanent magnet providing, when energized, a reverse magnetic field to substantially cancel the field produced by the permanent magnet and release the locking pawl on the controller and allow the biased controller to return to a neutral position.

2. A detent hold and release mechanism as set forth in claim 1, wherein the detent means includes multiple detents of different sizes whereby the manual effort to ride over the different detents can be distinguished.

3. A detent hold and release mechanism as set forth in claim 1, wherein the permanent magnet is positioned in axial contacting side-by-side alignment with the electro-magnet and sandwiched between portions of said pole pieces.

4. A detent hold and release mechanism as set forth in claim 1, wherein the spring arm connected to the locking pawl has sufficient flexibility to allow the locking pawl to ride over the detent means without breaking contact between the pole pieces and the contact plate.

5. A detent hold and release mechanism as set forth in claim 1, wherein the spring arm connected to the locking pawl has sufficient flexibility to allow the locking pawl to ride over the detent means without breaking contact between the pole pieces and the contact plate and a light spring means urging the contact plate towards the pole pieces.

* * * * *